(12) United States Patent  (10) Patent No.: US 9,008,924 B2
Jackson  (45) Date of Patent: Apr. 14, 2015

(54) TRANSMISSION CREEP CONTROL

(75) Inventor: Graeme A. Jackson, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 219 days.

(21) Appl. No.: 13/466,777

(22) Filed: May 8, 2012

(65) Prior Publication Data

US 2013/0304336 A1    Nov. 14, 2013

(51) Int. Cl.
*B60W 30/188* (2012.01)
*B60W 10/06* (2006.01)
*B60W 10/113* (2012.01)
*B60W 10/115* (2012.01)
*B60W 30/18* (2012.01)

(52) U.S. Cl.
CPC ............ *B60W 10/06* (2013.01); *B60W 10/113* (2013.01); *B60W 10/115* (2013.01); *B60W 30/18063* (2013.01); *B60W 2540/12* (2013.01); *B60W 2540/16* (2013.01); *B60W 2550/142* (2013.01); *B60W 2710/0666* (2013.01); *Y10T 477/644* (2013.01)

(58) Field of Classification Search
CPC ....................................................... B60W 10/02
USPC ............ 477/21, 24, 27, 94; 701/22, 31.1, 53, 701/54, 68
See application file for complete search history.

(56) References Cited

U.S. PATENT DOCUMENTS

| | | | |
|---|---|---|---|
| 8,315,752 B2 * | 11/2012 | Kwon et al. .................... | 701/22 |
| 8,439,795 B2 * | 5/2013 | Miyamoto et al. .............. | 477/27 |
| 8,721,499 B2 * | 5/2014 | Kim et al. ....................... | 477/180 |
| 2011/0288735 A1 * | 11/2011 | Shelton et al. ................. | 701/68 |
| 2012/0100958 A1 * | 4/2012 | Oue et al. ....................... | 477/21 |
| 2012/0150384 A1 * | 6/2012 | Jung et al. ...................... | 701/31.1 |
| 2013/0017928 A1 * | 1/2013 | Oh et al. ......................... | 477/94 |
| 2013/0288855 A1 * | 10/2013 | Monsere ......................... | 477/24 |
| 2013/0304336 A1 * | 11/2013 | Jackson .......................... | 701/53 |
| 2013/0311055 A1 * | 11/2013 | Whitney et al. ................ | 701/54 |

* cited by examiner

*Primary Examiner* — Thomas G Black
*Assistant Examiner* — Wae Louie
(74) *Attorney, Agent, or Firm* — Rader, Fishman & Grauer PLLC

(57) ABSTRACT

A transmission control system and method for controlling the level of creep torque supplied by a powertrain. The transmission control system having a controller configured to receive output signals from any one of a driver interface device sensor, a grade sensor, and a brake pedal sensor. Based on the output signals, the level of necessary creep torque and be determined and supplied, reducing unnecessary fuel consumption.

19 Claims, 4 Drawing Sheets

| Calibration value | |
|---|---|
| C1 | 500 |
| C2 | 10 |
| C3 | 5 |
| C4 | -100 |
| C5 | 3 |

| Grade | -15% | -10% | -5% | 0% | 5% | 15% |
|---|---|---|---|---|---|---|
| Torque 1 | n/a | n/a | n/a | 10 | 35 | 85 |
| Torque 2 | 5 | 5 | 5 | n/a | n/a | n/a |
| Torque 3 | 18 | 13 | 8 | n/a | n/a | n/a |

| | | | | | | |
|---|---|---|---|---|---|---|
| Torque brake pressed | 5 | 5 | 5 | 10 | 35 | 85 |
| Torque Brake not pressed | 18 | 13 | 8 | 10 | 35 | 85 |

FIG. 3

Calibration value

| C1 | 500 |
|---|---|
| C2 | 30 |
| C3 | 5 |
| C4 | 0 |
| C5 | 20 |

| Grade | -15% | -10% | -5% | 0% | 5% | 15% |
|---|---|---|---|---|---|---|
| Torque 1 | n/a | n/a | n/a | 30 | 55 | 105 |
| Torque 2 | 5 | 5 | 5 | n/a | n/a | n/a |
| Torque 3 | 20 | 20 | 20 | n/a | n/a | n/a |

| Torque brake pressed | 5 | 5 | 5 | 30 | 55 | 105 |
|---|---|---|---|---|---|---|
| Torque Brake not pressed | 20 | 20 | 20 | 30 | 55 | 105 |

*FIG. 4*

TRANSMISSION CREEP CONTROL

FIELD

The present disclosure generally relates to a transmission control system for controlling creep in a vehicle.

BACKGROUND

The powertrain system of an automobile is generally designed to supply a specific level of torque to the wheels of a vehicle even when the vehicle is stopped. This torque, commonly referred to as creep torque, works against the driver's application of the brakes such that the vehicle will begin to move when the brakes are released even if an accelerator is not depressed. However, in some situations, for example, when the vehicle is idling or when the vehicle is traveling down hill, a high level of creep torque is unnecessary and may cause needless consumption of fuel. Thus, there is a need for a transmission control system that can control the level of creep torque supplied by the powertrain to improve fuel economy.

On the other hand, supplying a consistently low level of creep torque or even no creep torque to increase fuel economy may be detrimental to driving performance. For example, supplying a low level of creep torque may cause unwanted rearward rolling when a vehicle is stopped on an uphill incline. Thus, there is also a need for a creep control system that can provide optimized creep performance while minimizing unnecessary fuel consumption.

BRIEF DESCRIPTION OF THE DRAWINGS

FIG. 3 is an exemplary calibration chart.

FIG. 4 is an exemplary calibration chart

DETAILED DESCRIPTION

Figure 1:
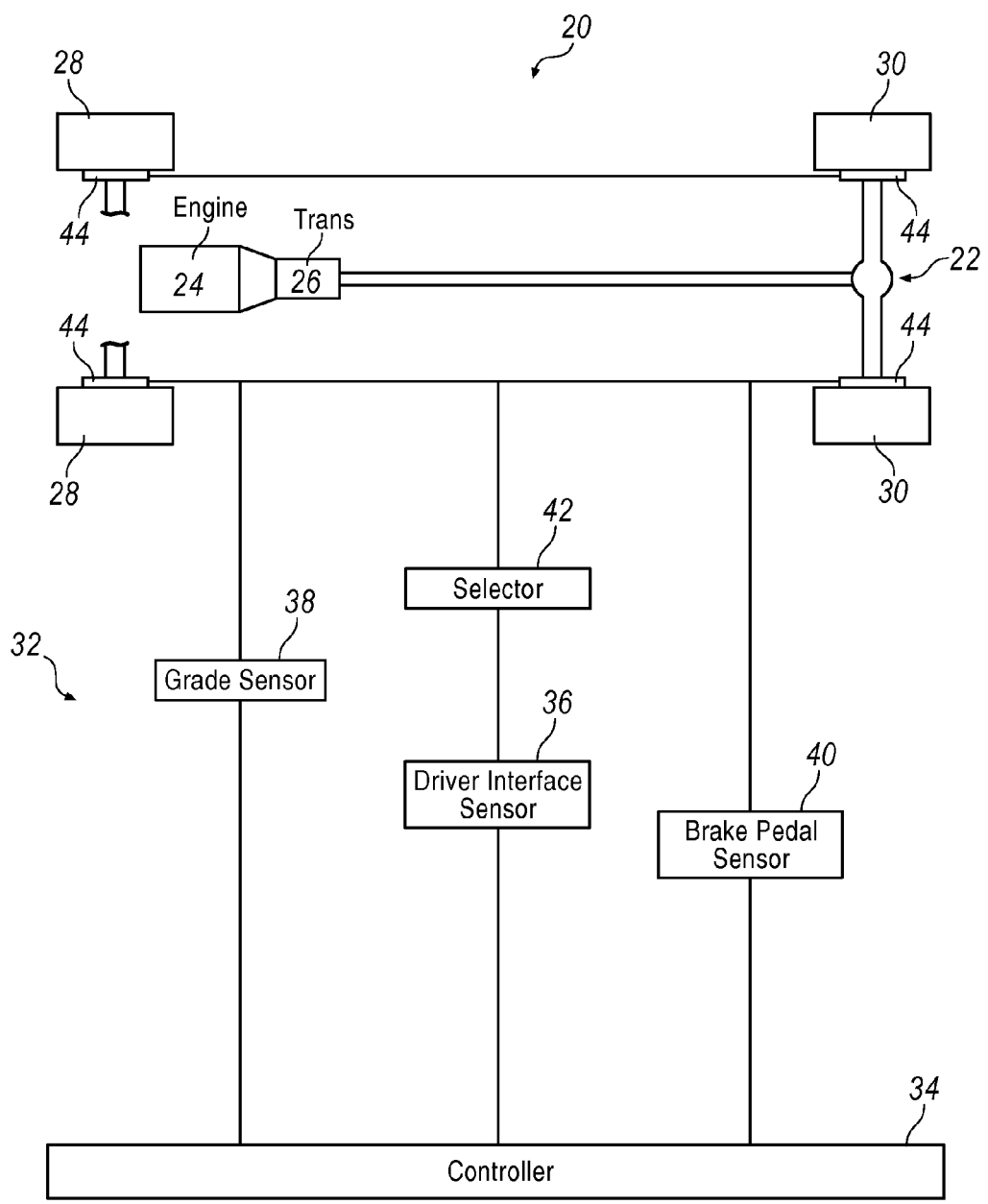
FIG. 1 is a schematic illustration of a transmission control system for controlling creep.

Referring now to the discussion that follows and also to the drawings, illustrative approaches are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

FIG. 1 schematically illustrates a vehicle 20. The vehicle 20 includes a drivetrain 22 having an engine 24, a transmission 26, a first pair of wheels that, for convenience in the discussion that follows, are called the front wheels 28, and a second pair of drive wheels 30, opposite wheels 28, that for convenience are called the rear wheels. While wheels 30 are illustrated as being the drive wheels, in practice either set of wheels 28 or 30 may be the drive wheels or both sets of wheels 28 and 30 may be drive wheels. FIG. 1 also illustrates an exemplary transmission control system 32 that may be used to control the operation of the transmission 26 of vehicle 20. For example, the transmission control system 32 may be configured to receive output signals that may be used to determine whether to actuate one or more clutches such as by way of a single-clutch, a dual-clutch, or a wet clutch transmission system. The transmission control system 32 may also be used to determine the level of creep torque to be supplied to the wheels. Thus, the transmission control system 32 may take many different forms and include multiple and/or alternate components. While an exemplary transmission control system 32 is shown in FIG. 1, the exemplary components illustrated in the figures are not intended to be limiting. Indeed, additional or alternative components and/or implementations may be used.

As illustrated in FIG. 1, the transmission control system 32 may include a computing device such as a controller 34 configured to process signals from one or more sensors, including a driver interface sensor 36, a grade sensor 38, and a brake pedal sensor 40, discussed in more detail below. The controller 34 may be configured to perform calculations on the signals based on pre-programmed logic rules in order to determine a level of creep torque to be supplied by the powertrain to the wheels.

Computing devices such as controller 34 may employ any of a number of computer operating systems known to those skilled in the art, including, but by no means limited to, microprocessor systems, such as those manufactured by Motorola and Intel. The controller 34 may also employ known versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Computing devices such as the foregoing generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other tangible medium from which a computer can read.

In one exemplary approach, the controller 34 may be an electronic control unit (ECU), such as a microprocessor-based control, wherein the controller receives output signals from any of the sensors described below. The controller 34 may also include a central processing unit (CPU) for processing the output signals received from the sensors based on the programmed logic rules.

The sensors may each output a signal to the controller 34 such that the transmission control system 32 may control the level of creep torque supplied by the powertrain based on the signals being received. Thus, the level of creep torque supplied to the wheels of the vehicle 20 may be based on various parameters including, but not limited to, the driver's intended gear selection and the position of the vehicle 20. By controlling the level of creep torque only the necessary level of creep torque is supplied to the wheels. For example, when a vehicle 20 is oriented downwardly with respect to an incline (i.e., expected to travel downwardly) the level of creep torque may be reduced, as compared to a vehicle oriented up an incline (i.e., expected to travel upwardly), because the vehicle 20 is being urged generally in the same direction as the vehicle is traveling. Thus, any additional torque transmitted to the wheels would be unnecessary and would cause needless fuel consumption. Therefore, controlling the level of creep torque can improve the fuel economy of the vehicle.

To determine the appropriate level of creep torque the controller 34 may communicate with each of a driver interface sensor 36, a grade sensor 38, and/or a brake pedal sensor 40. Such sensors provide information as to the driver's intended gear selection, the position of the vehicle, and engagement of the brakes, respectively. This information may be communicated to the controller 34 using an input circuit comprising a direct wire linkage. However, the controller 34 may also communicate with each of the driver interface sensor 36, the grade sensor 38, and/or the brake pedal sensor 40 using a network communication link such as a Vehicle Area Network (VAN). Other suitable networks may also include Local Area Networks (LANs), Wide Area Networks (WANs). A combination of direct wire linkages and/or network communication links may also be used.

To maintain a certain level of uniformity between the data networks of all the trucks on the road today and in the future, various organizations related to the field set forth protocols that govern not only the physical characteristics of vehicle networks, but also the format of the data that is passed along the networks. Two examples of network protocols designed specifically for in-vehicle networks are Controller Area Network (CAN) and SAE J-1708. J1708/1587 was established by the Society of Automotive Engineers (SAE). Protocol J1708/1587 establishes a serial data communications link for exchanging and monitoring data being communicated between microprocessors used in heavy-duty vehicle applications. Protocol J1708 generally defines the hardware requirements of the data communications link, while protocol J1587 deals with the actual data, the format of the data and/or functions that are to be transmitted across the data link.

Using the output signals that are sent through the input circuit, the controller 34 can determine the appropriate level of creep torque to be supplied given the current conditions of the vehicle. That is, the controller 34 and the CPU may be configured to perform calculations on the signals based on one or more programmed logic rules. A command output may be issued based on these calculations. Thus, the controller 34 can use the output signals received from the driver interface sensor 36, the grade sensor 38, and/or the brake pedal sensor 40 to determine the level of creep torque needed to provide ideal driving performance while reducing fuel economy.

As illustrated in FIG. 1, the controller 34 may process output signals from any one of the driver interface sensor 36, the grade sensor 38, the brake pedal sensor 40, or any other suitable sensor configured to output a signal. The driver interface sensor 36 is configured to output a signal representative of the desired mode of transmission or the desired gear ratio selected by the driver. The vehicle 20 may have one or more driver interface sensor 36. The driver interface sensor 36 may be a mechanical switch such as a non-contacting magnetic type switch. Magnetic switches generally offer higher reliability when used to determine sensor positions. Indeed, such switches may be configured to compensate for position tolerances and any changes in the mechanical connection. Magnetic switches may also provided improved durability, especially in vehicle applications. However, any suitable type of switch may be used to determine the desired mode of transmission or gear ratio. Moreover, the controller 34 may also be configured to decode a driver interface signal from an analogue, pulse width modulation (PWM) output or other types of sensor outputs to determine the sensor position.

In one exemplary approach, the controller 34 is in communication with the driver interface sensor 36 through a selector 42. The selector 42 may be any driver interface mechanism used to select a gear including, but not limited to, a shift lever and push buttons. The driver interface sensor 36 may be configured to determine whether the selector 42 is in a reverse, neutral, drive or parked position. The driver interface sensor 36 may also be positioned on the selector 42 or the sensor 36 may be positioned in any other suitable area of the vehicle 20 including the gearbox.

The driver interface sensor 36 may be configured to convert the position of the selector 42 into an electric output signal that is supplied to the controller 34. The controller 34 may then process the selection and determine whether to open/close the clutch and disengage/engage the gears. Thus, the controller 34 may provide an output command to control the level of creep torque supplied by the powertrain based on the driver's desired mode of transmission or the desired gear ratio. For example, if the vehicle is in a parked position, any level of creep torque is unnecessary because the vehicle is not moving forward nor does the driver intend for the vehicle to move forward. Thus, any level of creep torque supplied by the powertrain to the wheels results in needless fuel consumption. However, if a stationary vehicle is being shifted into a drive position, some level of creep torque may be desirable to urge the vehicle forward when the vehicle brakes are released, especially if the vehicle is on an incline.

As noted above, the transmission control system 32 may further include a grade sensor 38. The grade sensor 38 may be configured to determine whether the grade of the vehicle will result in the vehicle being urged in generally the same direction as the vehicle is traveling. The grade sensor 38 may be a single or multi-axis accelerometer, a mechanical grade sensing switch, or any other suitable sensor configured to determine the position of the vehicle with respect to a horizontal plane. That is, the grade sensor 38 may be configured to send an electric output signal to the controller 34 indicating whether the front wheels 28 are higher in altitude from a horizontal plane than the rear drive wheels 30. This would indicate that the vehicle was at a positive grade. The grade sensor 38 may also determine whether the front wheels 28 are lower in altitude from a horizontal plane than the rear drive wheels 30, such that the vehicle is at a negative grade. The grade sensor 66 may also be configured to determine when a vehicle is on a substantially flat surface, or at about a zero percent grade. To determine the grade of the vehicle 20, the controller 34 may communicate with one grade sensor 38 or a plurality of grade sensors.

The grade sensor 38 is configured to communicate with the controller 34 and may be disposed on any solid vehicular structure or within the vehicle itself. As discussed above, the grade sensor 38 may communicate with the controller 34 using a direct wire linkage. However, the grade sensor may also communicate with the controller 34 over a network communication link, described above. The grade sensor 38 may also be disposed within the controller 34. In one exemplary approach, the controller 34 may perform calculations on the signal based on the programmed logic in order to determine the percent grade of the vehicle 20. However, an accelerometer may also be used to determine the percent grade based on the electric output signals produced by the grade sensor 38.

As noted above, the transmission control system 32 may further include a brake pedal sensor 40. The brake pedal sensor 40 may be a mechanical switch such as a non-contacting magnetic type switch. However, other suitable switches may be used. The brake pedal sensor 40 is configured to provide an electric output signal to the controller 34 indicating whether the driver has engaged or disengaged the brakes 44. The brake pedal sensor 40 may be configured to send an output signal to the controller 34 indicating whether a driver has engaged the brakes by depressing the brake pedal. The brake pedal sensor 40 may also provide an output signal to the controller 34 indicating that the brake pedal has not been depressed or that the brake pedal is being released. The brake pedal sensor 40 may be disposed on the brake pedal or any other suitable portion of the vehicle. As discussed above, the grade sensor 38 may communicate with the controller 34 using a direct wire linkage, a network communication link or any combination thereof.

Figure 2:
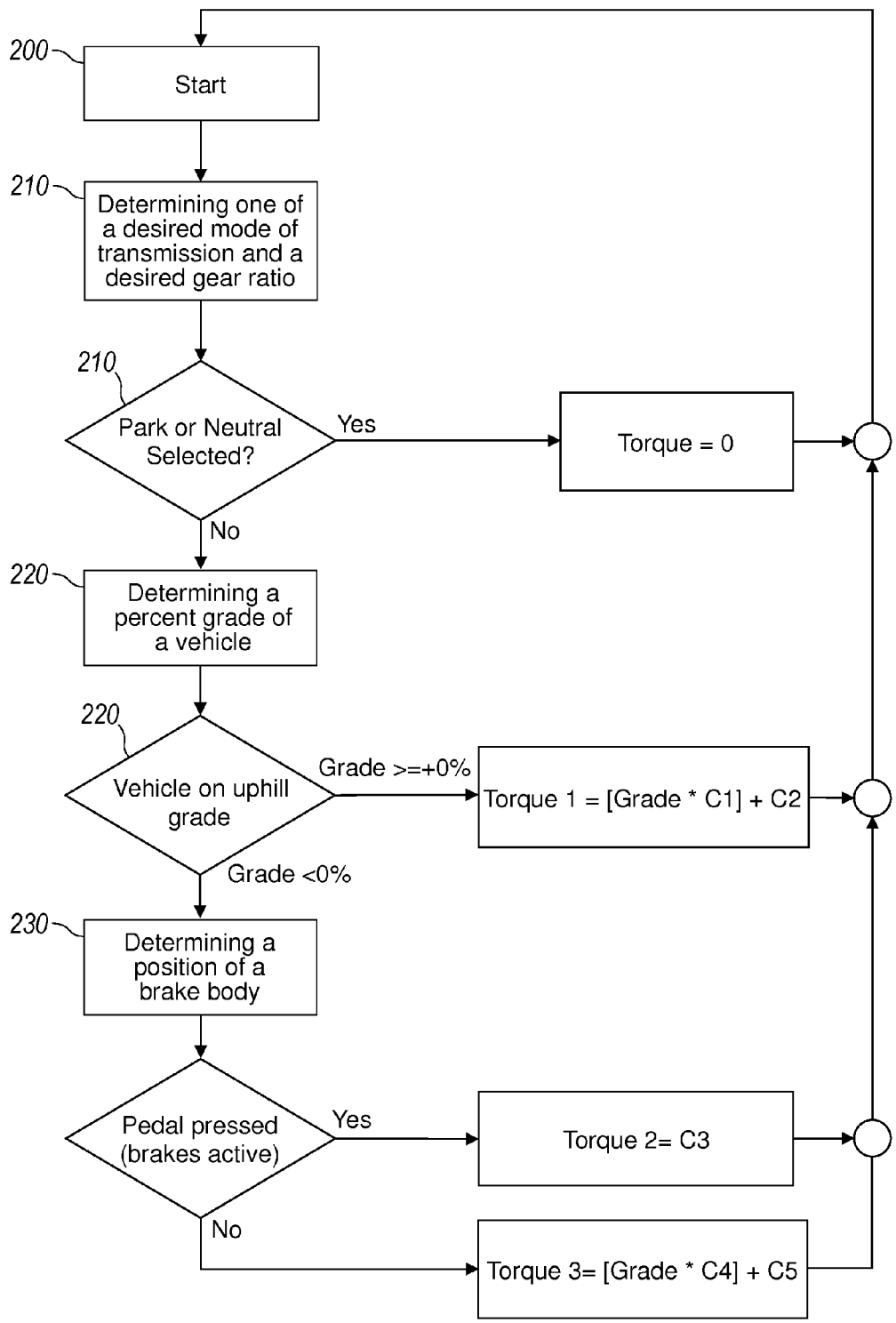
FIG. 2 is a flowchart illustrating a method of using a transmission control system for controlling creep.

With reference to FIG. 2, an exemplary method of operating the transmission control system 32 to provide ideal driving performance while reducing fuel consumption is shown. In Step 200, the computer operating system is enabled such that the level of creep torque to be supplied by the powertrain is determined. The controller 34 may begin processing the output signals received from any one of the driver interface sensor 36, the grade sensor 38, and the brake pedal sensor 40 the sensors. Based on the programmed logic rules, the appropriate level of creep torque is determined and provided to the wheels. By providing only the level of creep torque necessary based on the conditions of the vehicle and driver preference, wasteful fuel consumption can be prevented.

In Step 210, the controller 34 receives an output signal from the driver interface sensor 36. Based on the programmed logic rules, the controller 34 can process the output signal to determine the desired mode of transmission or the desired gear ratio selected by the driver. If the controller 34 determines that the vehicle transmission has been shifted into park or neutral, the controller 34 signals that no level of creep torque should be supplied by the powertrain to the wheels. Indeed, in either position, the powertrain is operatively disengaged from the front wheels 28 and the rear wheels 30. Therefore, any level of creep torque transmitted from the powertrain to the wheels would be needless and would waste fuel.

To the contrary, if the controller 34 determines that the vehicle is in drive mode, i.e. not shifted into park or neutral, the system 32 proceeds to Step 220. In step 220, the controller 34 receives output signals from the grade sensor 38. Again, based on the programmed logic rules, the controller 34 can process the output signals to determine the percent grade of the vehicle. If the grade sensor 38 sends an output signal to the controller 34 indicating that the vehicle is at a positive percent grade, i.e. the front wheels 28 are higher in altitude from a horizontal plane than the rear drive wheels 30, the controller 34 can calculate the appropriate level of creep torque that should be supplied.

Such calculations are based on the programmed logic rules and pre-determined calibration values. The calibration values are determined based a customer's driveability preference, that is, the qualitative assessment of the vehicle's response to the driver's input. As just one example, driveability may be based on the level of creep torque that is supplied when the brake pedal is pressed or not pressed. Depending on the type of vehicle or the purpose of the vehicle, more or less creep torque may be desired. The calibrations also take into account vehicle features that may have an affect on the customer's drivability preference, i.e. the weight of the vehicle. Generally the customer's preferred level of creep torque is provided as the preferred controller output and the necessary calibration values are determined based on the programmed logic rules. Exemplary calibration charts are provided in FIGS. 3 and 4. Although five calibration values are illustrated, in FIG. 3, more or less calibration values may be utilized.

The calibrations represent five calibration values C1 to C5 that when combined with the logic and calculations in FIG. 2 provide an output torque for conditions when the vehicle brakes are active or not active. Multiple calibration equations can be added as appropriate to provide more levels of control. Including, but not limited to, mathematical exponents that allow the linear gains to be provided as smoother curved gains.

In one exemplary approach, if the controller 34 determines in Step 220 of FIG. 2 that the vehicle is at about a zero percent grade, i.e. the vehicle is on a substantially flat surface, the calibration values are used to determine the level of creep torque to be supplied to the powertrain when the brake pedal is pressed or not pressed based on the customer's preference. In this exemplary approach, the level of creep torque to be supplied is represented by the equation $$T1 = (\text{Percent Vehicle Grade})(C_1) + (C_2)$$

wherein the calibration values are provided in Nm. The first calibration value ($C_1$) provides the level of creep torque gain necessary to assist the vehicle in its assent up hill. When ($C_1$) is multiplied by the vehicle grade the torque will be proportional to the creep torque gain calibration. The second calibration value ($C_2$) provides the level of creep torque offset. Thus, the offset allows the torque to be increased or decreased based on user preference.

Accordingly, when the vehicle is at a substantially zero percent grade, the level of creep torque supplied will be equal to the value of $C_2$. The value of $C_2$, being based on customer preference, may be a low level of creep torque, which causes the vehicle to maintain a slow, generally constant vehicle speed when the brake pedal is pressed or even when it is not pressed. A low level of a creep torque may also allow a vehicle to begin moving forward on a substantially flat surface without depressing the accelerator. However, as described above the value of $C_2$ may be set to provide any level of creep torque based on user preference. By controlling the level of creep torque fuel can be conserved.

Similarly, if the controller determines in Step 220 that the vehicle is at a greater than zero percent grade, i.e. the vehicle is on a positive percent grade, the same equation and calibration values may be used to determine the level of creep torque to be supplied. Typically, the calibration values are set so that the level of creep torque supplied will prevent rollback when the brake pedal is released. In one exemplary approach, the calibration values may be set such that the level of creep torque supplied to the powertrain is proportional to the grade of the incline. Thus, the level of creep torque supplied by the powertrain may be determined based on the angle of the incline such that only the necessary amount of torque is provided to assist the vehicle in moving up the incline. Accordingly, the application of excessive torque is prevented and unnecessary fuel consumption is decreased.

In, step 220, if the controller 34 determines that the vehicle is at a negative percent grade, i.e. the vehicle is directed down an inclined surface, the program logic causes controller 34 to proceed to step 230. In Step 230, the controller 34 receives an output signal from the brake pedal sensor 40. Based on the programmed logic rules, the controller 34 can process the output signal to determine whether the driver has engaged the brakes. In one exemplary approach, if the brakes have been engaged, the level of creep torque to be supplied is represented by the equation $$T2=(C_3)$$

wherein the calibration values are provided in Nm. The first calibration value ($C_3$) provides the level of creep torque gain provided when the brake pedal is pressed and the vehicle is traveling in a downhill direction. Accordingly, when the vehicle is at a negative grade and the brakes have been engaged, a driver generally does not need or want an excessive level of creep torque urging the vehicle forward. Thus, the level of creep torque necessary to meet the driver's preference can be determined and only that level of creep torque is applied.

If the brakes have not been engaged in Step 220, the level of creep torque to be supplied is represented by the equation $$T3=(\text{Percent Vehicle Grade})(C_4)+(C_5)$$

wherein the calibration values are provided in Nm. The first calibration value ($C_4$) provides the level of creep torque gain necessary to assist the vehicle in its decent downhill. When ($C_4$) is multiplied by the vehicle grade the torque will be proportional to the creep torque gain calibration. The second calibration value ($C_5$) provides the level of creep torque offset. Thus, the offset allows the torque to be increased or decreased based on user preference.

When a vehicle 20 is traveling down an incline the level of creep torque necessary to urge the vehicle forward is reduced, as compared to a vehicle traveling up an incline, because the vehicle 20 is being urged in the direction that it is traveling if the goal is to move forward. Accordingly, the calibration values may be set such that the level of creep torque provided is proportional to the grade of the incline. Thus, the level of creep torque supplied is configured to assist the vehicle moving down an incline. Because the level of creep torque is proportional to the grade of the incline only the level of creep torque necessary to assist the vehicle is provided such, reducing the amount of excessive torque supplied by the powertrain and ultimately decreasing unnecessary fuel consumption.

FIG. 4 illustrates exemplary calibration chart. The calibration values illustrated in FIG. 3 provide a torque output that is more directed towards a vehicle configured for fuel economy whereas the calibration chart in FIG. 4 is more directed towards driveability. That is, the creep torque calibrations in FIG. 3 for the same conditions are lower that those in FIG. 4 to save fuel. In FIG. 4, the creep torque calibrations are maintained at higher values to provide the driver with a fast vehicle response.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. A transmission control device comprising:
   a controller; and
   at least one driver interface sensor configured to communicate a driver interface output signal representative of a mode of transmission to the controller;
   at least one grade sensor configured to communicate a grade output signal representative of the grade sensor position with respect to a horizontal plane to with the controller; and
   at least one brake pedal sensor configured to communicate a brake pedal output representative of one of an engaged or a disengaged brake pedal with the controller;
   wherein the device is configured for a vehicle having a dual clutch transmission; and
   wherein the controller is configured to:
      determine whether the vehicle is on an uphill grade or on a negative grade using the grade sensor;
      obtain a calibration constant that is based on whether the vehicle is on the uphill grade or the negative grade;
      determine a level of creep torque to be supplied based on at least one of the driver interface output, the grade output, and the brake pedal output, and determine the level of creep torque using the calibration constant; and
      determine whether to open or close a clutch based on the determined level of creep torque.

2. The transmission control device of claim 1, wherein the driver interface sensor is configured to communicate a desired gear ratio to the controller, and wherein the driver interface sensor communicates with the controller through a selector.

3. The transmission control device of claim 1, wherein the controller is configured to determine the level of creep torque using the constant in a first equation if the at least one grade sensor indicates the vehicle is on a grade that is uphill, and using the constant in a second equation if the vehicle is on a grade that is negative.

4. The transmission control device of claim 3, wherein the first and second equations are both mathematical expressions in which the calibration constants are different from one another.

5. The transmission control device of claim 4, wherein the calibration constants for each of the first and second equations are based on a customer's driveability preference that include a fuel economy mode and a driveability mode.

6. The transmission control device of claim 5, wherein, for a given grade of the vehicle, the determined level of torque creep is greater for the driveability mode than for the fuel economy mode.

7. A method for controlling creep torque during the operation of a vehicle, the method comprising:
receiving a driver interface output signal from a driver interface sensor, wherein the driver interface sensor is configured to communicate one of a mode of transmission and a gear ratio;
receiving a grade sensor output signal from a grade sensor, wherein the grade sensor is configured to communicate the position of the vehicle with respect to a horizontal plane, and configured to communicate whether the vehicle is on an uphill grade or on a negative grade;
receiving a brake pedal output signal from a brake pedal sensor, wherein the brake pedal sensor is configured to communicate a pedal position;
obtaining a calibration constant that is based on whether the vehicle is on the uphill grade or the negative grade;
determining at least one of the desired mode of transmission of the vehicle, the desired gear ratio of the vehicle, the vehicle grade, and the position of the pedal using the output signals;
controlling a level of creep torque to be supplied based on the output from at least one of the sensors, and based on the calibration constant, wherein controlling the level of creep torque supplied during the operation of the vehicle reduces fuel consumption; and
determining whether to open or close a clutch based on the desired mode of transmission of the vehicle.

8. The method of claim 7, further comprising determining the level of creep torque using a set of programmed logic rules and at least one pre-determined calibration value, wherein the calibration value is based on a qualitative assessment of the vehicle response to a driver input.

9. The method of claim 7, further comprising, wherein the level of creep torque supplied is equal to the grade of the vehicle multiplied by the calibration constant that corresponds to when the vehicle is at one of a positive grade and a substantially zero grade.

10. The method of claim 9, wherein the level of creep torque supplied is offset by a creep torque offset factor.

11. The method of claim 9, wherein the level of creep torque supplied is proportional to the grade of the vehicle when the vehicle has the positive grade.

12. The method of claim 7, further comprising determining the position of the pedal when the vehicle is at a negative grade.

13. The method of claim 12, wherein the level of creep torque supplied is equal to the grade of the vehicle multiplied by a creep torque gain factor when the vehicle is at negative grade.

14. The method of claim 13, wherein the level of creep torque supplied is offset by a creep torque offset factor.

15. The method of claim 13, wherein the level of creep torque supplied is proportional to the grade of the vehicle when the vehicle has the negative grade.

16. The method of claim 7, further comprising determining the level of creep torque using the constant in a first equation if the grade sensor indicates the vehicle is on a grade that is greater than zero, and using the constant in a second equation if the vehicle is on a grade that is less than zero.

17. The method of claim 16, wherein the first and second equations are both mathematical expressions in which the calibration constants that are different from one another.

18. The method of claim 17, wherein the calibration constants for each of the first and second equations are based on a customer's driveability preference that include a fuel economy mode and a driveability mode, and wherein, for a given grade of the vehicle, the determined level of torque creep is greater for the driveability mode than for the fuel economy mode.

19. A computer-readable medium tangibly embodying computer-executable instructions comprising:
receiving an output signal from at least one of a driver interface sensor, a grade sensor, and a brake pedal sensor;
determining whether the vehicle is on an uphill grade or on a negative grade using an output signal from the grade sensor;
obtaining a calibration constant that is based on whether the vehicle is on the uphill grade or the negative grade;
performing calculations on the output signal based on a programmed set of logic rules and using the calibration constant;
determining a level of creep torque to be supplied to a vehicle powertrain based on the programmed set of logic rules;
transmitting the determined level of creep torque to the vehicle powertrain; and
determining whether to open or close a clutch based on a desired mode of transmission of a vehicle.

* * * * *